(12) United States Patent
Funke et al.

(10) Patent No.: US 9,340,214 B2
(45) Date of Patent: May 17, 2016

(54) SYSTEM FOR REMOTELY CONTROLLING A MACHINE

(71) Applicant: Caterpillar Inc., Peoria, IL (US)

(72) Inventors: Brian G. Funke, Peoria, IL (US);
Daniel Stanek, Chillicothe, IL (US);
Troy K. Becicka, Sahuarita, AZ (US);
Seth J. Redenbo, Metamora, IL (US);
Paul Friend, Morton, IL (US); Daniel K. Dunn, Dunlap, IL (US); Kenneth L. Stratton, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 11 days.

(21) Appl. No.: 14/252,081

(22) Filed: Apr. 14, 2014

(65) Prior Publication Data

US 2015/0291180 A1    Oct. 15, 2015

(51) Int. Cl.
*B60W 50/04* (2006.01)

(52) U.S. Cl.
CPC ....... *B60W 50/045* (2013.01); *B60W 2050/046* (2013.01)

(58) Field of Classification Search
CPC .... C08C 25/00; C08C 25/04; C08C 2201/50; C08C 2201/51; G07C 5/008; B60W 50/045; B60W 2050/046
See application file for complete search history.

(56) References Cited

U.S. PATENT DOCUMENTS

| | | | |
|---|---|---|---|
| 4,812,842 A * | 3/1989 | Bayerlein et al. | 340/12.54 |
| 5,742,915 A | 4/1998 | Stafford | |
| 5,903,558 A | 5/1999 | Jones et al. | |
| 6,285,925 B1 * | 9/2001 | Steffen | 701/2 |
| 6,625,589 B1 | 9/2003 | Varma et al. | |
| 6,633,800 B1 * | 10/2003 | Ward | B60W 50/02 180/167 |
| 6,694,235 B2 | 2/2004 | Akiyama | |
| 6,704,564 B1 | 3/2004 | Lange et al. | |
| 7,149,188 B2 | 12/2006 | Wilson | |
| 7,392,017 B2 | 6/2008 | Chu et al. | |
| 8,438,604 B2 | 5/2013 | Howcroft et al. | |
| 2004/0152423 A1 | 8/2004 | Reznik | |
| 2005/0114879 A1 | 5/2005 | Kamieniecki | |
| 2005/0226193 A1 | 10/2005 | Karhiniemi et al. | |
| 2007/0063834 A1 * | 3/2007 | Bozzone | A63H 30/04 340/539.1 |
| 2012/0329423 A1 | 12/2012 | Ryan | |
| 2014/0222247 A1 * | 8/2014 | Friend | G05D 1/0276 701/2 |

* cited by examiner

*Primary Examiner* — Fadey Jabr
*Assistant Examiner* — Aaron L Troost
(74) *Attorney, Agent, or Firm* — Leydig, Voit & Mayer, Ltd.

(57) ABSTRACT

A system for remotely controlling a machine includes a remote input device, a transmitter remote from the machine, and a receiver at the machine. A controller is configured to store a desired communications threshold, receive input commands from the remote input device, generate a plurality of remote control input signals based upon the input commands, and transmit the plurality of remote control input signals at a location remote from the machine. The controller is further configured to receive at least some of the plurality of remote control input signals at the machine, determine a communications parameter based upon at least one of the plurality of remote control input signals, compare the communications parameter to the desired communications threshold, and generate a command to stop the machine if the communications parameter is outside the desired communications threshold.

20 Claims, 4 Drawing Sheets

SYSTEM FOR REMOTELY CONTROLLING A MACHINE

TECHNICAL FIELD

This disclosure relates generally to remotely controlling movement of a machine and, more particularly, to a system and method for monitoring the quality of the communication between a machine and a system remotely controlling the operation of the machine.

BACKGROUND

Machines such as dozers, load trucks, motor graders, wheel loaders, etc., are used to perform a variety of tasks, and they may move about a work site as they move material and perform other operations at the work site. The machines may be operated by remote control to perform these tasks in response to commands generated at a remote control console or another system remote from a machine. Remotely controlled machines may increase productivity and/or permit operation in environments that are unsuitable or undesirable for a human operator.

As a remotely controlled machine performs its tasks, it receives information and instructions from systems that are located remotely from the machine. Although a remote system may send signals at consistent intervals, each of the signals may not be received by the machine, may include errors, or may be delayed. In instances in which no signals are received for a predetermined period of time, the remote operation of the machine may be terminated. However, in some instances, sufficient signals may reach the machine to permit operation but such signals may not accurately reflect the currently desired movement or operation of the machine due to delays or an insufficient number of received messages.

U.S. Pat. No. 7,392,017 discloses a system for assessing the quality of coverage within a wireless network. A service performance monitor may obtain performance indicators. The performance indicators may be used to represent the network performance for one or more network service areas.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for remotely controlling a machine includes a remote input device located remote from the machine for generating a plurality of remote control input signals, a transmitter remote from the machine for transmitting the plurality of remote control input signals, and a receiver at the machine for receiving the plurality of remote control input signals. A controller is configured to store a desired communications threshold, receive input commands from the remote input device, generate the plurality of remote control input signals based upon the input commands, and transmit the plurality of remote control input signals at a location remote from the machine. The controller is further configured to receive at least some of the plurality of remote control input signals at the machine, determine a communications parameter based upon at least one of the plurality of remote control input signals, compare the communications parameter to the desired communications threshold, and generate a command to stop the machine if the communications parameter is outside of the desired communications threshold.

In another aspect, a method of remotely controlling a machine includes storing a desired communications threshold, receiving input commands from a remote input device located remote from the machine, generating a plurality of remote control input signals based upon the input commands, and transmitting the plurality of remote control input signals at a location remote from the machine. The method further includes receiving at least some of the plurality of remote control input signals at the machine, determining a communications parameter based upon at least one of the plurality of remote control input signals, comparing the communications parameter to the desired communications threshold, and generating a command to stop the machine if the communications parameter is outside of the desired communications threshold.

In still another aspect, a system for controlling movement of a machine within a work site includes a drive system for causing movement of the machine, a position sensor associated with the machine for generating position signals indicative of a position of the machine, a remote input device located remote from the machine for generating a plurality of remote control input signals, a transmitter remote from the machine for transmitting the plurality of remote control input signals, and a receiver at the machine for receiving the plurality of remote control input signals. A controller is configured to store a desired communications threshold, receive input commands from the remote input device, generate the plurality of remote control input signals based upon the input commands, and transmit the plurality of remote control input signals at a location remote from the machine. The controller is further configured to receive at least some of the plurality of remote control input signals at the machine, determine a communications parameter based upon at least one of the plurality of remote control input signals, compare the communications parameter to the desired communications threshold, and generate a command to stop the machine if the communications parameter is outside of the desired communications threshold.

DETAILED DESCRIPTION

Figure 1:
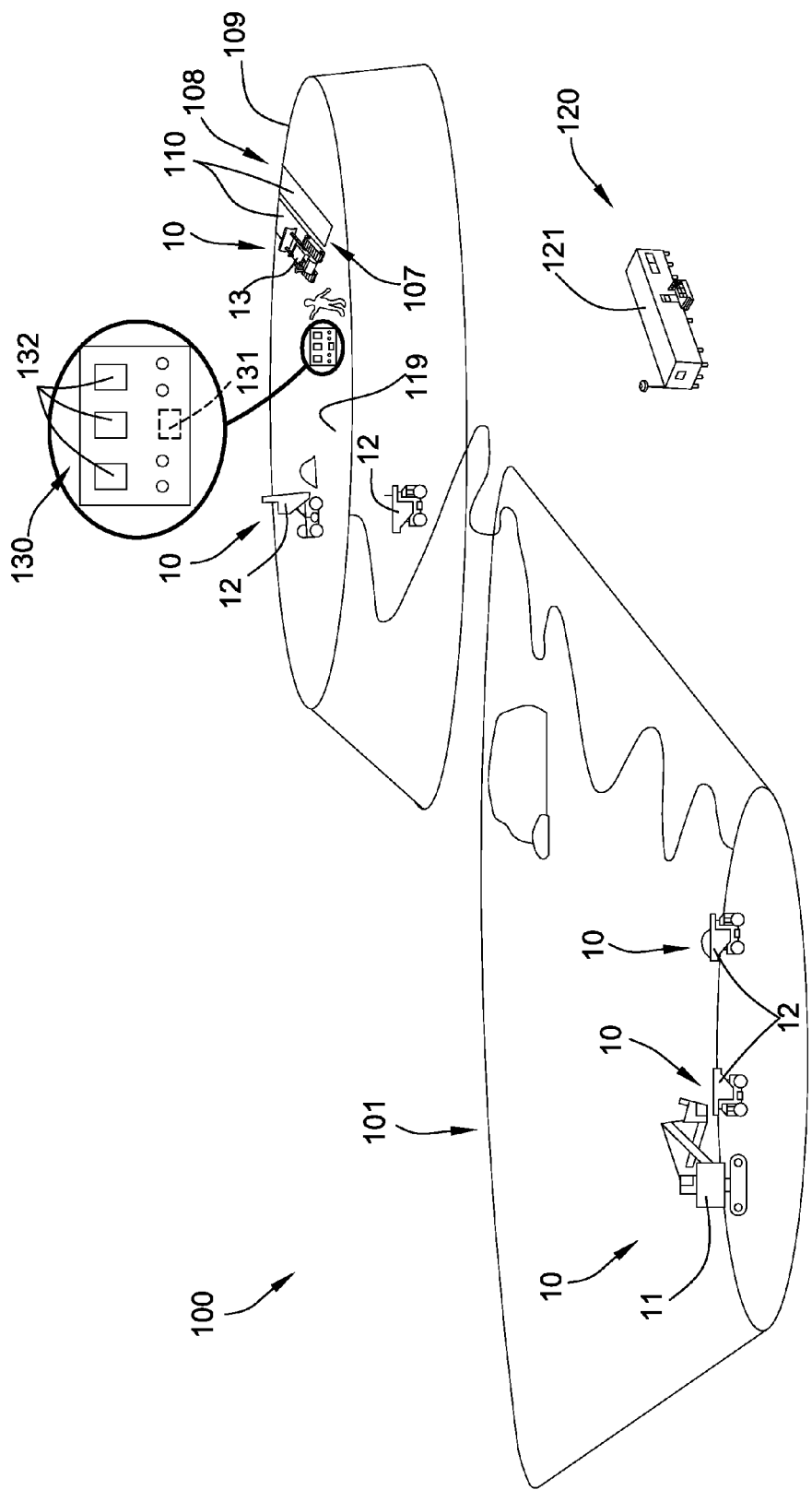
FIG. 1 depicts a schematic illustration of a work site at which a machine incorporating the principles disclosed herein may be used.

FIG. 1 depicts a diagrammatic illustration of a work site 100 at which one or more machines 10 may operate in an autonomous, a semi-autonomous, or manual manner. Work site 100 may be a portion of a mining site, a landfill, a quarry, a construction site, a roadwork site, a forest, a farm, or any other area in which movement of machines is desired. As depicted, work site 100 includes an open-cast or open pit mine 101 from which material 104 may be excavated or removed by a machine such as an excavator 11 and loaded into a machine such as a load truck 12. The load trucks 12 may travel along a road 102 to dump location 108 at which the material 104 is dumped. A machine such as a dozer 13 may move material 104 along the work surface 105 towards a crest 106 such as an edge of a ridge, embankment, high wall or other change in elevation.

As used herein, a machine 10 operating in an autonomous manner operates automatically based upon information received from various sensors without the need for human operator input. As an example, a haul or load truck 12 that automatically follows a path from one location to another and dumps a load at an end point may be operating autonomously. A machine 10 operating semi-autonomously includes an operator, either within the machine or remotely, who performs some tasks or provides some input and other tasks are performed automatically and may be based upon information received from various sensors. As an example, a load truck 12 that automatically follows a path from one location to another but relies upon an operator command to dump a load may be operating semi-autonomously. In another example of a semi-autonomous operation, an operator may dump a bucket from an excavator 11 in a load truck 12 and a controller may automatically return the bucket to a position to perform another digging operation. A machine 10 being operated manually is one in which an operator is controlling all or essentially all of the functions of the machine. A machine 10 may be operated remotely by an operator (i.e., remote control) in either a manual or semi-autonomous manner.

Figure 2:
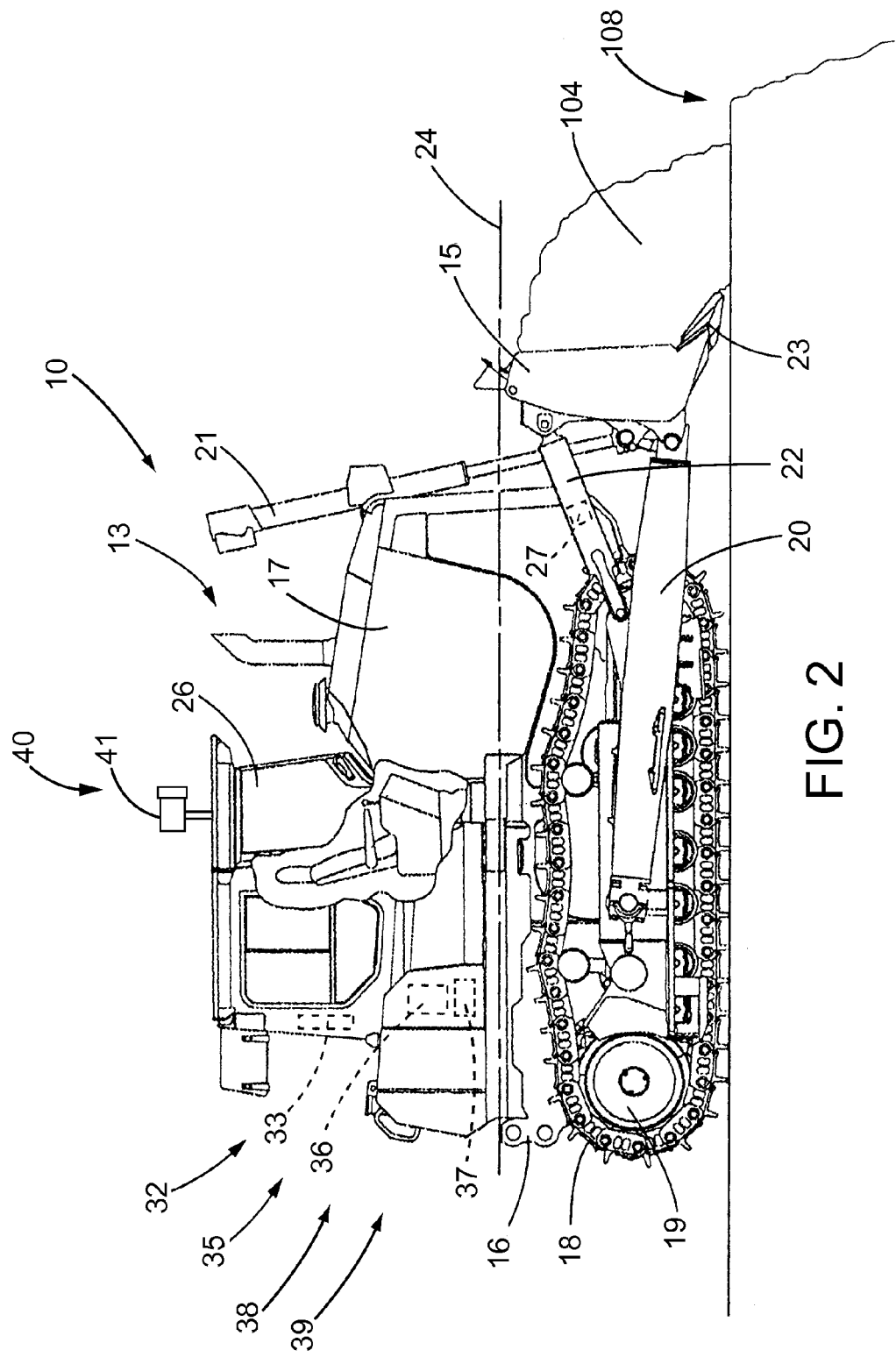
FIG. 2 depicts a diagrammatic illustration of a machine in accordance with the disclosure.

FIG. 2 shows a diagrammatic illustration of a machine 10 such as a dozer 13 adjacent crest 106 with a work implement such as a blade 15 pushing material 104 over the crest. The machine 10 includes a frame 16 and a prime mover such as an engine 17. A ground-engaging drive mechanism such as a track 18 on each side of machine 10 is driven by a drive wheel 19 to propel the machine. Although machine 10 is shown in a "track-type" configuration, other configurations, such as a wheeled configuration, may be used. Operation of the engine 17 and a transmission (not shown) which are operatively connected to the tracks 18 and drive wheels 19 may be controlled by a control system 35 including a controller 36. Other types of prime movers and drive systems for causing movement of the machine 10 are contemplated.

Machine 10 may include a ground engaging work implement such as blade 15 pivotally connected to frame 16 by arms 20 on each side of machine 10. First hydraulic cylinder 21 coupled to frame 16 supports blade 15 in the vertical direction, and allows blade 15 to move up or down vertically from the point of view of FIG. 2. Second hydraulic cylinders 22 on each side of machine 10 allow the pitch angle of blade tip 23 to change relative to a centerline 24 of the machine.

Machine 10 may include a cab 26 that an operator may physically occupy and provide input to control the machine. Cab 26 may include one or more input devices through which the operator issues commands to control the propulsion and steering of the machine 10 as well as operate various implements associated with the machine.

Machine 10 may be equipped with a plurality of sensors that provide data indicative (directly or indirectly) of various operating parameters of the machine. The term "sensor" is meant to be used in its broadest sense to include one or more sensors and related components that may be associated with the machine 10 and that may cooperate to sense various functions, operations, and operating characteristics of the machine.

For example, position sensing system 32, as shown generally by an arrow in FIG. 2 indicating association with the machine 10, may include a position sensor 33 to sense a position of the machine relative to the work site 100. The position sensor 33 may include a plurality of individual sensors that cooperate to provide signals to controller 36 to indicate the position of the machine 10. In one example, the position sensor 33 may include one or more sensors that interact with a positioning system such as a global navigation satellite system or global positioning system "GPS" to operate as a GPS sensor. The controller 36 may determine the position of the machine 10 within work site 100 as well as the orientation of the machine such as its heading, pitch and roll.

The machine 10 may include a visual image system 40 such as a camera system for generating visual images indicative of a point of view relative to the machine 10. The visual image system 40 may include a plurality of visual image sensors such as cameras 41 for generating visual image signals. The visual image signals may be transmitted wirelessly to a system remote from machine 10. The plurality of cameras 41 of the visual image system 40 may be positioned to capture different views that an operator would have from within the cab 26 of machine 10. If desired, a plurality of cameras 41 may also be positioned to provide a point of view including the machine 10 and/or the blade 15 as well as a portion of the work site 100 at which the machine is operating. The visual image system 40 may be desirable in a plurality of instances including when operating the machine 10 remotely via a remote control console 130 (FIG. 1), when the visibility of an operator within the cab 26 is limited, or when personal remote from the machine desire to observe the operation of the machine such as when the machine is operating autonomously.

Machine 10 may be controlled by a control system 35 as shown generally by an arrow in FIG. 2 indicating association with the machine 10. The control system 35 may include an electronic control module or controller 36. The controller 36 may receive input signals from a wireless communications system 120 (FIG. 1), remote control input signals from an operator using a remote control unit or remote control console 130 to operate machine 10 remotely, or operator input signals from an operator operating the machine 10 from within cab 26. The controller 36 may control the operation of various aspects of the machine 10 including the drivetrain and the hydraulic systems.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions and the operating environment of the machine 10 and the work site 100 that may be stored in the memory of controller. Each of these data maps may include a collection of data in the form of tables, graphs, and/or equations.

The control system 35 may be located on the machine 10 and may also include components located remotely from the machine such as at a command center 121 (FIG. 1) or at the remote control console 130. The functionality of control system 35 may be distributed so that certain functions are performed at machine 10 and other functions are performed remotely. In such case, the control system 35 may include a communications system such as wireless communications system 120 for transmitting signals between the machine 10 and a system located remote from the machine. In one embodiment, remote control console 130 positioned remote from the machine 10 may provide some or all of the specific commands that are then transmitted by the wireless communications system 120 to systems of the machine.

When operating the machine 10 via a remote control system, a portion of the control system 35 may be located at the remote control unit or remote control console 130. Accordingly, machine 10 may include a machine controller 37 and remote control console 130 may include a console controller 131. The machine controller 37 and the console controller 131 may be components of controller 36.

In one example, the remote control console 130 may be configured with an instrument array similar to that of the machine 10 with a plurality of gauges, displays, and input devices such as buttons, knobs, dials, levers, joysticks, and other controls (not shown). The remote control console 130 may also include a point of view display 132 that includes one or more displays upon which visual images from the visual image system 40 may be displayed to depict a point of view relative to machine 10. The point of view display 132 may be used to display images depicting the front, the left side, and the right side of machine 10. If desired, additional images of other points of view may be displayed such as behind the machine 10 or views of other aspects of the machine such as the blade 15. Signals from the various sensors on the machine 10 may be transmitted directly or indirectly to the remote control console 130 and displayed on the instrument array. If desired, the remote control console 130 may be configured in a manner similar to the actual cab 26 of the machine 10.

Figure 3:
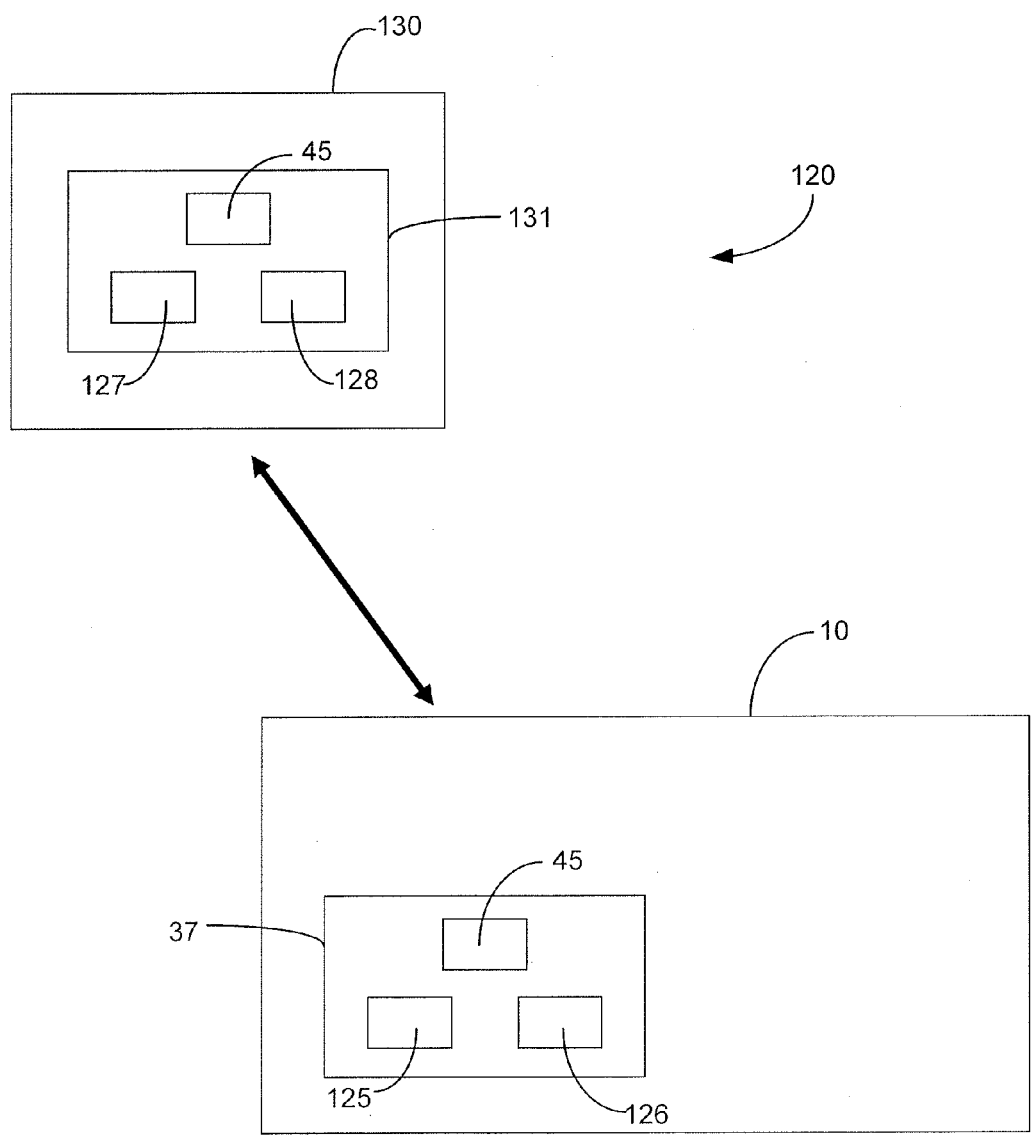
FIG. 3 depicts a schematic illustration of a wireless communications system in accordance with the disclosure.

When operating machine 10 by remote control, the machine 10 and the remote control console 130 may communicate via the wireless communications system 120. Each of the machine 10 and the remote control console 130 may include wireless communication devices to permit wireless transmission of a plurality of data signals between the machine and the remote control console as well as permit communication with other systems remote from the machine and the remote control console. As depicted in FIG. 3, machine 10 may include machine transmitter 125 and a machine receiver 126. The remote control console 130 may include a remote control transmitter 127 and a remote control receiver 128. The transmitters and receivers may be a portion of the respective machine controller 37 and the console controller 131, if desired. In operation, signals transmitted by the remote control console 130 may be generated by the console controller 131 and then transmitted by the remote control transmitter 127 to the machine receiver 126 and then processed by machine controller 37. Signals transmitted from the machine 10 to the remote control console 130 may be generated by the machine controller 37 and then transmitted by the machine transmitter 125 to the remote control receiver 128 and then processed by console controller 131.

Data signals such as remote control input signals that are transmitted from remote control console 130 to machine 10 may be configured in any form. In one example, the data signals may be configured as binary signals having multiple sections or components. A first or message section may be used to transmit a message such as instructions or data. A second or error detection section may include components or elements for use by one or more error detection processes or systems. A third or indexing section may include a counter for determining or tracking the order in which messages are generated. Such indexing section may operate by assigning a signal index or reference number to each signal with such signal index increasing by one with each signal that is generated. As used herein, data signal are designated as $x_1$, $x_2$, $x_3$, etc. with the subscript corresponding to the signal index. For simplicity, the controller 36 may operate by increasing the signal index until reaching a predetermined maximum number at which time the next signal index is set back to 1 and the process is repeated. A fourth or timing section may include a time stamp or another indicator of the time at which the message was generated.

When operating machine 10 through remote control console 130, it is important that the machine receive instructions that are both timely and accurately reflect the actual input commands from the operator of the remote control console. However, in some instances, the remote control input signals may be modified or degraded during the communications process or altogether not received at the machine controller 37.

One manner of increasing the accuracy of instructions is to include within control system 35 an error detection system 38 as shown generally by an arrow in FIG. 2 for detecting errors in the data signals that are sent between the machine 10 and the remote control console 130. The error detection system 38 may utilize any process or technique for detecting errors in the data signals such as parity checks, cyclic redundancy checks, and/or any other error detection methods. For example, a data signal sent by remote control transmitter 127 is received by machine receiver 126 and then may be checked by error detection system 38. In some instances, the control system 35 may discard a data signal if the error detection system 38 determines that the data signal includes an error. In other instances, if a data signal includes an error, the control system 35 may request that the console controller 131 resend the data signal from the remote control transmitter 127 to the machine receiver 126. Data signals that are discarded are not used with any further processes.

A manner of increasing the likelihood that the instructions received by the machine 10 both accurately reflect the input commands from the operator and have been received in a timely manner is to determine the quality of the communication between remote control transmitter 127 and machine receiver 126. Control system 35 may include a quality of communications system 39 as shown generally by an arrow in FIG. 2 for analyzing the quality of the communications between the machine 10 and the remote control console 130. More specifically, after the data signals are processed by the error detection system 38, the data signals may be analyzed by the quality of communications system 39 of control system 35 to determine whether the communications between the remote control console 130 and the machine controller 37 are performing well enough so that the data signals may be relied upon to operate the machine 10 remotely. In doing so, the quality of communications system 39 may evaluate the operation of the control system 35 and the controller 36 from the time the data signals are generated at the console controller 131 until the signals are received at the machine controller 37. As set forth below, the quality of communications system 39 may process the data signals in a plurality of manners to ensure that the data signals that are used to remotely operate the machine 10 have been received in a timely manner and accurately reflect the instructions from the remote operator. The quality of communications system 39 thus ensures that the remote operator has the desired control over the machine 10.

Figure 4:
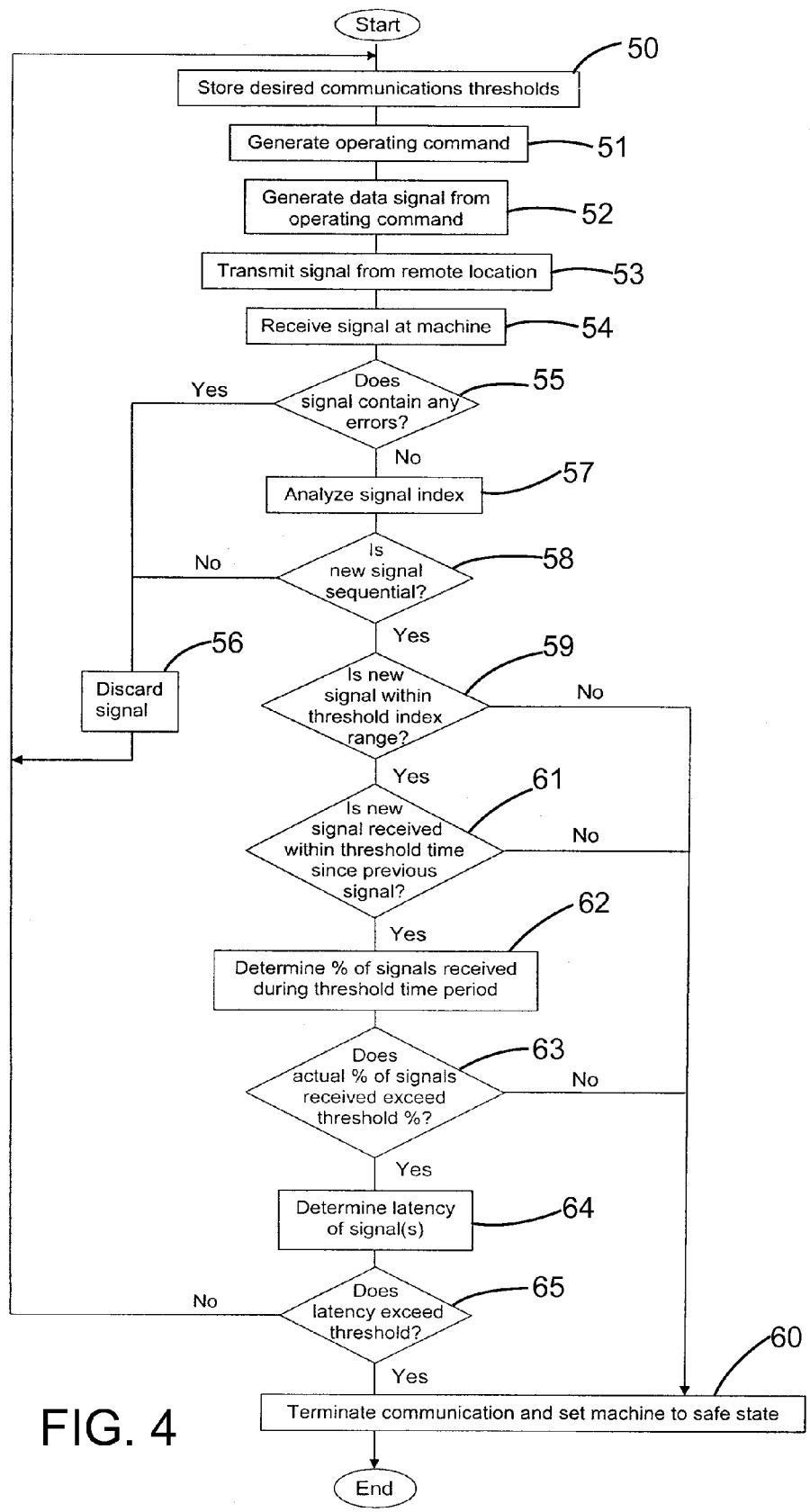
FIG. 4 depicts a flowchart illustrating the remote control operation of a machine in accordance with the disclosure.

Referring to FIG. 4, a flowchart of the operation of the machine 10 by remote control is depicted. At stage 50, a plurality of desired communications thresholds may be stored within controller 36 and, more particularly, within machine controller 37 if desired. The communications thresholds set maximum or minimum conditions that are used by the quality of communications system 39. At stage 51, an operator at remote control console 130 may move an input device (not shown) to reflect a desired movement of machine 10 which results in the generation of input commands by the console controller 131. Console controller 131 may generate at stage 52 a plurality of data signals in the form of a plurality of remote control input signals based upon the input commands. At stage 53, the remote control transmitter 127 may wirelessly transmit the plurality of remote control input signals. At least some of the plurality of remote control input signals may be received at machine receiver 126 of machine controller 37 at stage 54.

The error detection system 38 may operate at decision stage 55 to determine whether each remote control input signal contains an error. In doing so, the error detection system 38 may check the parity, redundancy, or any other aspect of the remote control input signal or the error detection section of the signal. If the error detection system 38 determines that a remote control input signal contains an error, the machine controller 37 may discard at stage 56 the remote control input signal that includes the error. In some embodiments, the machine controller 37 may transmit a signal to the console controller 131 requesting a re-transmission of the remote control input signal that included the error.

If the error detection system 38 determines at decision stage 55 that a remote control input signal does not contain an error, the quality of communications system 39 may operate to determine the quality of the communication between the remote control console 130 and the machine 10. As stated above, the quality of communications system 39 may process the remote control input signals in one or more of a plurality of manners.

At stage 57, the machine controller 37 may analyze the signal index of each remote control input signal. As each remote control input signal is generated by the console controller 131, the signal index of each new signal is increased by one. The machine controller 37 may determine at decision stage 58 whether the signals have been received out of order. In doing so, machine controller 37 may compare the signal index of the most recently received or new remote control input signal to the signal index of the last received remote control input signal. If the new remote control input signal has not been received in order or sequentially (i.e., the signal index of the new signal (e.g., $x_1$) is less than the signal index of the last received signal (e.g., $x_3$)), the quality of communications system 39 may discard the remote control input signal at stage 56.

It should be noted that at decision stage 58, the quality of communications system 39 is only analyzing the order in which the signals are received. As a result, a new remote control input signal will be considered to be in order regardless of the number of intervening remote control input signals that were sent by the remote control transmitter 127 and not received by the machine receiver 126 so long as the signal index of the new remote control input signal is greater than the signal index of the most recently received remote control input signal. For example, if the last received remote control input signal has a signal index of 1 (and the last received signal designated $x_1$) and the next twenty remote control input signals transmitted by the remote control transmitter 127 are not received, the new remote control input signal may have a signal index of 22 (and the new signal designated $x_{22}$). Since the signal index of signal $x_{22}$ is greater than the signal index of signal $x_1$, the new remote control input signal shall be considered to be received in order. In other words, machine controller 37 may compare a first signal such as $x_1$ to a second signal $x_{22}$ to determine whether the new signal has been received in order. Based upon this process, any remote control input signals that are received out of order are discarded at stage 56.

If the new remote control input signal is received in order, the remote control input signal may be further analyzed by the quality of communications system 39. The quality of communications system 39 of machine controller 37 may analyze the new remote control input signal at decision stage 59 to determine whether the new signal is within a threshold or a predetermined range of the signal index of the last received signal. In one example, the threshold may be set at 75. As a result, the signal index of the new remote control input signal must be within 75 of the signal index of the last received remote control input signal. In other words, if the signal index of the last received remote control input signal is 1 (and the last received signal designated $x_1$), the new remote control input signal will not be within the threshold or predetermined index range at decision stage 59 if the signal index of such new signal is greater than 76 (and the new signal designated $x_{76}$). If the signal index of the new remote control input signal is not within the predetermined range, the machine controller 37 may at stage 60 terminate communication between the remote control console 130 and the machine 10 and set the machine to a safe state. In one example, such a safe state may maintain the machine 10 in an idle mode and set the transmission of the machine to neutral. If desired, the machine controller 37 may also generate an alert signal or command to notify the operator at the remote control console 130 and any other desired personnel of the termination of communication. In an alternate embodiment, if the signal index of the new remote control input signal is not within the predetermined range, the new remote control input signal may be discarded at stage 56 rather than terminating the communication and setting the machine 10 to a safe mode.

If the signal index of the new remote control input signal is within the predetermined range, the quality of communications system 39 may continue to analyze one or more of a plurality of remote control input signals to determine the quality of the communication between the remote control console 130 and the machine 10.

At decision stage 61, the quality of communications system 39 of machine controller 37 may analyze the new remote control input signal to determine whether the new signal was received within a threshold or a predetermined time from the receipt of the last received signal. In one example, the threshold may be set at 1000 ms. Other time periods may be used as desired. In operation, the quality of communications system 39 may be configured to monitor or record the time at which each remote control input signal is received. The machine controller 37 may determine at decision stage 61 whether the new remote control input signal was received within 1000 ms of the receipt of the last remote control input signal. If the new remote control input signal is received more than 1000 ms after the receipt of the last signal, the machine controller 37 may at stage 60 terminate communication between the remote control console 130 and the machine 10 and set the machine to a safe state. It should be noted that at decision stage 61, the quality of communications system 39 does not analyze the time stamp or other type of indicator embedded within the timing section of the signals. Instead, the quality of communications system 39 merely monitors the time of receipt of each signal by the machine receiver 126 and compares it to the time the previous signal was received.

If the new remote control input signal is received within the predetermined time period, the quality of communications system 39 may use other parameters to monitor the quality of the communication between the remote control console 130 and machine 10. For example, the quality of communications system 39 may evaluate the quality of the communication based upon the percentage of usable remote control input signals that were actually received over a predetermined time period. More specifically, at stage 62, the machine controller 37 may determine the number of usable or good signals that were actually received by machine receiver 126 over a predetermined time period and a percentage of usable signals may be determined based upon the number of signals that should have been sent during that time period.

At decision stage 63, the quality of communications system 39 may determine whether the percentage of remote control input signals actually received exceeds or is outside of a desired or threshold percentage. If the actual percentage does not exceed the threshold percentage, the machine controller 37 may at stage 60 terminate communication between the remote control console 130 and the machine 10 and place the machine in a safe state. In one example, the threshold percentage may be set to 66% but other percentages may be used.

If the actual percentage of remote control input signals received does exceed the threshold percentage at decision stage 63, the quality of communications system 39 may use other parameters to monitor the quality of the communication between the remote control console 130 and machine 10. For example, the quality of communications system 39 may determine at stage 64 the extent of any latency with respect to the remote control input signals that have been received by machine receiver 126. In other words, the quality of communications system 39 may determine the time delay between when a particular remote control input signal is generated and when it is received.

In one example, the remote control input signals may include a timing section that stores a time stamp as to when the signal was generated. The console controller 131 may determine and embed therein the time at which each remote control input signal is generated. The machine controller 37 may read the timing section of each remote control input signal and compare the time at which the signal was generated to the time it arrived at the machine controller to determine the extent of any latency or delay in the receipt of the signal.

In one embodiment, each of the machine controller 37 and the console controller 131 may include clock mechanisms 45 that independently maintain the time of day. At periodic intervals, the machine controller 37 and the console controller 131 may communicate to synchronize the clock mechanisms 45. In another embodiment, each of the machine controller 37 and the console controller 131 may synchronize their clock mechanisms 45 based upon signals received from a common source wherein the signals include time of day data. For example, the machine controller 37 and the console controller 131 may receive GPS signals that include such time of day data.

In another example, the latency of the remote control input signal may be determined without including a timing section or timing data within each signal and by including a clock mechanism 45 only at the machine controller 37. With such a process, the machine controller 37 may determine the number of remote control input signals that should be received within a certain time period and determine the signal index of each remote control input signal that should be received. The machine controller 37 may compare the actual signal index of each received remote control input signal to the expected signal index of the remote control input signal that should have been received at any particular time. The difference between the expected signal index and the actual signal index may be used to determine the latency or delay of the remote control input signal since the remote control input signals are generated at predetermined consistent intervals.

As an example, if a remote control input signal is generated every 20 ms and the machine controller 37 expected to receive a remote control input signal having a signal index of 51 (e.g., $x_{51}$) but instead received a remote control input signal having a signal index of 1 (e.g., $x_1$), the quality of communications system 39 may determine that the most recently received signal has been delayed by 1000 ms (50 signals×20 ms).

While the examples above analyze latency based upon a single input signal, in an additional example the latency of the wireless communications system 120 may be monitored by counting or tracking the number of remote control input signals that are received within a series of predetermined time periods. For example, if a remote control input signal is generated every 20 ms by the console controller 131, the machine receiver 126 would theoretically receive fifty signals every second. However, the machine receiver 126 may receive fewer than fifty signals every second and the number of signals received every second may vary. It should be noted that in some instances, it is possible that the machine receiver 126 may receive more than fifty signals in a second (e.g., if some component along the communications path stores or slows the signals, the signals may subsequently be sent as a batch or in a burst so that more than fifty signals are received in a second). If the number of signals received during each predetermined time period varies by more than a desired or threshold percentage, the quality of communications system 39 may determine that the latency exceeds a predetermined threshold.

If the latency of the quality of communications system 39 does not exceed the predetermined threshold at decision stage 65, the operation of the machine 10 may continue by repeating stages 51-65. If the latency of the quality of communications system 39 exceeds the predetermined threshold, the machine controller 37 may at stage 60 terminate communication between the remote control console 130 and the machine 10 and place the machine in a safe state.

From the forgoing, it may be understood that the quality of communications system 39 may utilize a plurality of processes to measure one or more parameters during the operation of the machine 10. Each of the processes measures certain communications parameters and each parameter is measured or compared to a different communications threshold. For example, at decision stage 58, the quality of communications system 39 determines whether the signals are received out of order. In doing so, the communications parameter is the order of the signal indices and the communications threshold is whether the signal index of the most recently received signal is greater than the signal index of the previously received signal. At decision stage 59, the quality of communications system 39 determines the number of signals that are not being used either because they were discarded (such as by the error detection system 38) or such signals were just not received. In doing so, the communications parameter is the difference between the signal indices of the previously received signal and the most recently received signal and the communications threshold may be set to any desired number that reflects an acceptable number of skipped signals. In one example, the threshold may be set at 75 but other thresholds may also be used.

At decision stage 61, the quality of communications system 39 may determine whether the signals are being received on a periodic basis. In other words, the quality of communications system 39 may determine the time between receipt of sequentially received messages. If the time between the receipt of the signals is too large (regardless of the signal indices), the quality of communications system 39 will determine that the signals are not being sent on a periodic basis. At decision stage 61, the communications parameter is the interval or length of time between the receipt of sequentially received signals and the communications threshold is a specified period of time. In one example, the threshold may be set at 1000 ms but other thresholds may be used.

At decision stage 63, the quality of communications system 39 may determine whether the wireless communications system 120 is operating intermittently. In doing so, the machine controller 37 may count the number of signals received during a predetermined time period. If the number of signals received during the predetermined time period is less than a predetermined number, the wireless communications system 120 will be deemed to be operating intermittently. At decision stage 63, the communications parameter is the number of signals received within a predetermined time period and the communications threshold is a specified number of signals. In one example, the threshold may be set at 50 signals received within a 1500 ms time period.

At decision stage 65, the quality of communications system 39 may determine the extent of any latency within the wireless communications system 120. In one example, the quality of communications system 39 may operated by including a time stamp within a signal as the signal is generated by console controller 131 and then reading the time stamp after the signal is received at the machine controller 37. If greater than a predetermined time period has elapsed before the receipt of the signal, the latency threshold will be deemed to have been exceeded. In connection with such process, the communications parameter is the difference in time between signal generation and signal receipt. The communications threshold may be set to a time at which a delay becomes unacceptable. In one example, the communications threshold may be set to two seconds but other time periods may be used.

Depending upon the impact or result of the processes, some of the parameters may be characterized as minor parameters and others may be characterized as major parameters. For example, at decision stages 58 and 59, the result of the processes may be that the machine controller 37 discards the most recently received remote control input signal. As such, the parameters measured at decision stages 58 (sequential signals) and 59 (threshold index range) may be characterized as minor parameters as they only directly affect the particular most recently received signal. The result of the processes at decision stages 61, 63, and 65 may, however, result in termination of the operation of the machine 10. Accordingly, the parameters measured at decision stages 61 (threshold time interval), 63 (percentage of signals received), and 65 (latency) may be characterized as major parameters as they may directly affect or control the remote operation of machine 10.

Although described in the context of signals traveling from the remote control console 130 to the machine 10, the concepts disclosed herein are also applicable to signals traveling from the machine to the remote control console or from other systems to or from the machine or the remote control console. However, the thresholds for the various parameters used to measure the quality of communication may be different depending upon the direction in which the signals are traveling. In addition, the communications thresholds may be set based upon the type of operation being performed, the proximity to other machines, personnel, and other obstacles, as well as the preferences of the operator or other personnel.

INDUSTRIAL APPLICABILITY

The industrial applicability of the system described herein will be readily appreciated from the forgoing discussion. The foregoing discussion is applicable to machines 10 that are operated by remote control to move in a desired manner. Such system may be used at a mining site, a landfill, a quarry, a construction site, a roadwork site, a forest, a farm, or any other area in which movement of a machine is desired.

When an operator provides input commands at remote control console 130, the console controller 131 may generate remote control input signals based upon the input commands and such signals are transmitted by remote control transmitter 127 of console controller 131 to machine 10. The remote control input signals are received by machine receiver 126 of machine controller 37 and may be analyzed by quality of communications system 39 of controller 36.

In one aspect, the quality of communications system 39 operates to improve safety and control of the remote operation of the machine 10 by stopping the machine if the quality of communication between the machine 10 and the remote control console 130 degrades past one or more predetermined thresholds. In case of such degradation, commands generated by the remote operator may be received intermittently by the machine 10 or their transmission or receipt may be delayed. In other words, if the data signals from the operator are only periodically reaching the machine 10 or the signals are delayed, a command issued by the operator may not reflect the current intent of the operator. Accordingly, the quality of communications system 39 operates to monitor the wireless communications system 120 to improve the performance of machine 10.

It will be appreciated that the foregoing description provides examples of the disclosed system and technique. All references to the disclosure or examples thereof are intended to reference the particular example being discussed at that point and are not intended to imply any limitation as to the scope of the disclosure more generally. For example, although described in the context of slot dozing, the foregoing description is applicable to a wide variety of environments, operations, and applications. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for remotely controlling a machine comprising:
  a remote input device located remote from the machine for generating input commands;
  a transmitter remote from the machine for transmitting a plurality of remote control input signals;
  a receiver at the machine for receiving the plurality of remote control input signals; and
  a controller configured to:
    store a desired percentage of signals received threshold, the percentage of signals received threshold being less than 100 percent;
    receive the input commands from the remote input device;
    generate the plurality of remote control input signals based upon the input commands;
    transmit the plurality of remote control input signals at a location remote from the machine;
    receive the plurality of remote control input signals at the machine;
    determine a percentage of signals received based upon the plurality of remote control input signals;
    compare the percentage of signals received to the desired percentage of signals received threshold; and
    generate a command to stop the machine when the percentage of signals received is less than the desired percentage of signals received threshold.

2. The system of claim 1, wherein the controller is further configured to store a second desired communications threshold, determine a second communications parameter based upon at least two of the plurality of remote control input signals, compare the second communications parameter to the second desired communications threshold, and generate a command to stop the machine when the second communications parameter exceeds the second desired communications threshold.

3. The system of claim 2, wherein the controller further includes an error detection system configured to detect errors in the plurality of remote control input signals.

4. The system of claim 1, wherein the receiver is configured to receive a first remote control input signal and a second remote control input signal, the second remote control input signal being received after receipt of the first remote control input signal, and the controller determines a communications parameter by determining a first time at which the first remote control input signal is received by the receiver and a second time at which the second remote control input signal is received by the receiver, and determines whether a difference between the first time and the second time exceeds a predetermined period of time.

5. The system of claim 1, wherein the controller determines a communications parameter by determining a number of the plurality of remote control input signals received within a plurality of predetermined periods of time.

6. The system of claim 1, wherein the controller is further configured to:
  determine a minor communications parameter based upon a first remote control input signal and a second remote control input signal, the second remote control input signal being received by a receiver on the machine after receipt of the first remote control input signal;
  compare the minor communications parameter to a desired minor communications threshold; and
  discard the second remote control input signal when the minor communications parameter is outside of the desired minor communications threshold.

7. The system of claim 6, wherein each of the first remote control input signal and the second remote control input signal includes a signal index and the controller determines the minor communications parameter by determining whether the signal index of the first remote control input signal is less than the signal index of the second remote control input signal.

8. The system of claim 6, wherein each of the first remote control input signal and the second remote control input signal includes a signal index and the controller determines the minor communications parameter by determining whether the signal index of the first remote control input signal is within a predetermined range of the signal index of the second remote control input signal.

9. The system of claim 1, wherein the remote input device is a remote control console and the input commands are based upon manual movement of the remote input device at the remote control console by an operator.

10. The system of claim 1, wherein the controller is further configured to store a desired latency threshold, determine a transmit time at which one of the plurality of remote control input signals was sent by the transmitter, determine a receipt time at which the one of the plurality of remote control input signals was received by the receiver, determine a latency of the one of the plurality of remote control input signals based upon a difference between the transmit time and the receipt time, compare the latency to the desired latency threshold, and generate a command to stop the machine when the latency is greater than the desired latency threshold.

11. The system of claim 10, wherein the controller includes a machine controller on the machine and the machine controller is configured to store the desired latency threshold therein and receive the one of the plurality of remote control input signals.

12. The system of claim 11, wherein the machine controller is further configured to determine the latency of the one of the plurality of remote control input signals based upon a time stamp indicative of when the remote control input signal was generated.

13. The system of claim 11, wherein the remote control input signals include a signal index and the machine controller is further configured to determine the latency of the one of the plurality of remote control input signals based upon its signal index.

14. A method of remotely controlling a machine comprising:
  storing a desired percentage of signals received threshold;
  receiving input commands from a remote input device located remote from the machine;
  generating a plurality of remote control input signals based upon the input commands;
  transmitting the plurality of remote control input signals at a location remote from the machine;
  receiving the plurality of remote control input signals at the machine;
  determining a percentage of signals received based upon the plurality of remote control input signals;
  comparing the percentage of signals received to the desired percentage of signals received threshold; and
  generating a command to stop the machine when the percentage of signals received is less than the desired percentage of signals received threshold.

15. The method of claim 14, further including storing a second desired communications threshold, determining a second communications parameter based upon at least two of the plurality of remote control input signals, comparing the second communications parameter to the second desired communications threshold, and generating a command to stop the machine when the second communications parameter exceeds the second desired communications threshold.

16. The method of claim 14, further including receiving a first remote control input signal and a second remote control input signal, the second remote control input signal being received after receipt of the first remote control input signal, and determining the communications parameter by determining a first time at which the first remote control input signal is received by a receiver on the machine and a second time at which the second remote control input signal is received by the receiver, and determining whether a difference between the first time and the second time exceeds a predetermined period of time.

17. The method of claim 14, further including determining a communications parameter by determining a number of the plurality of remote control input signals received within plurality of predetermined periods of time.

18. The method of claim 14, further including:
   determining a minor communications parameter based upon a first remote control input signal and a second remote control input signal, the second remote control input signal being received by a receiver on the machine after receipt of the first remote control input signal;
   comparing the minor communications parameter to a desired minor communications threshold; and
   discarding the second remote control input signal when the minor communications parameter is outside of the desired minor communications threshold.

19. The method of claim 14, further including detecting errors in the plurality of remote control input signals.

20. A system for controlling movement of a machine within a work site, comprising:
   a drive system for causing movement of the machine;
   a position sensor associated with the machine for generating position signals indicative of a position of the machine;
   a remote input device located remote from the machine for generating input commands;
   a transmitter remote from the machine for transmitting a plurality of remote control input signals;
   a receiver at the machine for receiving the plurality of remote control input signals; and
   a controller configured to:
      store a desired percentage of signals received threshold, the percentage of signals received threshold being less than 100 percent;
      receive the input commands from the remote input device;
      generate the plurality of remote control input signals based upon the input commands;
      transmit the plurality of remote control input signals at a location remote from the machine;
      receive the plurality of remote control input signals at the machine;
      determine a percentage of signals received based upon the plurality of remote control input signals;
      compare the percentage of signals received to the desired percentage of signals received threshold; and
      generate a command to stop the machine when the percentage of signals received is less than the desired percentage of signals received threshold.

\* \* \* \* \*